US008820220B2

(12) United States Patent
Thelen et al.

(10) Patent No.: US 8,820,220 B2
(45) Date of Patent: Sep. 2, 2014

(54) PRESSURE VESSEL

(75) Inventors: Arnold Thelen, Kempfeld (DE); Joachim Neef, Herrstein (DE)

(73) Assignee: Fissler GmbH (DE)

(*) Notice: Subject to any disclaimer, the term of this patent is extended or adjusted under 35 U.S.C. 154(b) by 392 days.

(21) Appl. No.: 12/933,034

(22) PCT Filed: May 29, 2009

(86) PCT No.: PCT/EP2009/003869
§ 371 (c)(1),
(2), (4) Date: Sep. 16, 2010

(87) PCT Pub. No.: WO2009/156043
PCT Pub. Date: Dec. 30, 2009

(65) Prior Publication Data
US 2011/0011274 A1   Jan. 20, 2011

(30) Foreign Application Priority Data
Jun. 25, 2008  (DE) .................. 10 2008 030 077

(51) Int. Cl.
*A47J 27/08*   (2006.01)
*A47J 27/09*   (2006.01)

(52) U.S. Cl.
CPC .............. *A47J 27/09* (2013.01); *A47J 27/0806* (2013.01)
USPC .......................................................... 99/337

(58) Field of Classification Search
USPC .......... 277/321, 630; 220/293, 303, 316, 788; 99/337–348
See application file for complete search history.

(56) References Cited

U.S. PATENT DOCUMENTS

| 2,600,703 A | | 6/1952 | Strom |
| 2,600,714 A | * | 6/1952 | Wenscott et al. ............. 220/298 |
| 4,276,990 A | | 7/1981 | Chiodo |

(Continued)

FOREIGN PATENT DOCUMENTS

| CH | 404 908 A | 12/1965 |
| CH | 407 459 A | 2/1966 |

(Continued)

OTHER PUBLICATIONS

Translation of International Preliminary Report on Patentability of PCT/EP2009/003869, dated Jan. 13, 2011, 7 pages.

(Continued)

*Primary Examiner* — Dana Ross
*Assistant Examiner* — Renee L Miller
(74) *Attorney, Agent, or Firm* — Cantor Colburn LLP

(57) ABSTRACT

A pressure vessel includes a pot-like receptacle and a lid for placing thereon, the two being detachably locked together and including a circumferential sealing ring made of elastically yielding material which is located in the region of a circular edge of the lid and a circular edge of the pot for the purpose of sealing the interior against a drop in pressure. Sealing lips of the sealing ring come into close contact with the edge of the lid and the edge of the receptacle, in which case, for producing an automatic pressure-control mechanism, the sealing ring is formed over at least one portion of its circumference in such a way that it is deformed, under a pressure inside the vessel which exceeds a given value (response pressure), so as to form a venting gap between the receptacle and the lid.

13 Claims, 3 Drawing Sheets

(56) References Cited

U.S. PATENT DOCUMENTS

| | | | | |
|---|---|---|---|---|
| 4,434,909 | A | * | 3/1984 | Ott .................................. 220/316 |
| 5,641,085 | A | * | 6/1997 | Lonbardo ................. 220/203.12 |
| 6,695,319 | B1 | | 2/2004 | Anota et al. |
| 7,147,228 | B2 | * | 12/2006 | Tonkin ........................... 277/321 |

FOREIGN PATENT DOCUMENTS

| | | | |
|---|---|---|---|
| CH | 571 335 | A5 | 1/1976 |
| DE | 976 952 | C | 9/1964 |
| DE | 1 247 581 | B | 8/1967 |
| DE | 30 27 091 | A1 | 2/1982 |
| DE | 44 32 083 | A1 | 9/1995 |
| DE | 295 08 504 | U1 | 9/1995 |
| DE | 699 12 437 | T2 | 11/2004 |
| EP | 0 684 001 | B1 | 11/1995 |
| FR | 2 782 257 | A1 | 2/2000 |
| GB | 2 208 131 | A | 3/1989 |
| JP | 61-56613 | A | 3/1986 |
| JP | 1-230316 | A | 9/1989 |
| JP | 6-78851 | A | 3/1994 |
| WO | WO 01/39643 | A1 | 6/2001 |

OTHER PUBLICATIONS

Japanese Office Action issued Mar. 29, 2011 re: Japanese Application No. P2010-517423.

Japanese Office Action issued Mar. 6 2012 re: Japanese Application No. P2010-517423.

* cited by examiner

PRESSURE VESSEL

The present invention relates to a pressure vessel comprising a pot-like receptacle and a lid for placing thereon, the two being detachably locked together, preferably by means of peripheral locking segments of a bayonet catch, said pressure vessel also being provided with a circumferential sealing ring made of elastic flexible material, such as rubber or plastic, which is seated in the region of a circular edge of the lid and a circular edge of the pot for the purpose of sealing the interior of the pot in the locked position of receptacle and lid against a drop in pressure. This can be achieved by sealing lips of the sealing ring respectively resting tightly against the edge of the lid and the edge of the receptacle to provide an automatic pressure-control mechanism, whereby the sealing ring is formed over at least one portion of its circumference in such a way that it is deformed by a pressure inside the vessel which exceeds a preset value (response pressure), to form a venting gap between receptacle and lid.

BACKGROUND

DE 30 27 091 A1 discloses peripheral sealing means on a pressure cooker, in which case a pot and lid can be fastened together so as to be pressure-tight by means of peripheral segments formed along the lines of a bayonet lock with interposition, between the edge of the pot and the edge of the lid, of a sealing ring made of rubber elastic material, a circumferential, essentially cylinder-jacket-like peripheral section being bent downwards from the body of the lid and adjoined by the radially inward-curved peripheral segments of the lid. The outward-oriented rear part or spine of the sealing ring rests against the inside surfaces of the lid, and its inward-oriented sealing lips respectively rests against the inside surface of the pot and the inside surface of the body of the lid, in which case, in addition, the preferably symmetrical spine of the sealing ring has a circular cross-section over an angle of more than 90° in its upper half of largest circumference, and only rests against the body of the lid in a corresponding region of circular cross-section on the inside surface of a curved transitional portion of the body of the lid. The objective of providing a pressure cooker of the aforementioned type with an additional, i.e. possibly third, pressure safety device in addition to safety and venting valve means (DE-PS 1 247 581) and an overpressure valve device (DE-PS 976 952) is thus achieved by simple means. In this case, when a critical or limiting pressure is exceeded, a rotation and deflection of the sealing ring can occur in such a way as to form an opening.

CH 571 335 discloses a pressure cooker with a lid with a cylindrical edge which is detachably fixed onto the cooking pot by means of a bayonet lock and in which a sealing ring is inserted which has a sealing lip resting against the lid and against the edge of the cooking pot respectively and which covers at least one opening provided at the edge of the lid between two adjacent lugs of the bayonet lock, in which case in the section of the sealing ring covering the opening there is a weakened point reducing the cross-section of said sealing ring and the sealing lip resting against the edge of the pot has an indentation at its edge in the region of this weakened point. Thus a pressure cooker with an overpressure safety device formed by the sealing ring is said to be provided, with the overpressure safety device responding reliably and steadily without the need for the edge of the lid to be excessively weakened. However, the cylindrical downward-oriented peripheral portion of the lid openings are provided in the vicinity of recesses provided in the annular portion of the sealing ring which reduce the cross-section of said annular portion so that a weakened point is produced. In the region of said recesses, an indentation is provided at the edge of the sealing lip facing the edge of the cooking pot. In use, the sealing ring hermetically seals the interior of the cooking pot. If for particular reasons the pressure inside the pressure cooker rises, then when it reaches a specific overpressure the portion of the sealing ring lying in the region of the opening and having the recess is forced outwards through said opening. Thus the sealing lip associated with the edge of the cooking pot is moved outwards over the edge of the cooking pot until a portion of it no longer rests against the edge of the pot and the indentation establishes a connection between the interior of the pot and the atmosphere, through which steam starts to escape. This design is disadvantageous since openings must be provided in the edge of the lid, involving additional labour costs in terms of manufacture and resulting in a weakening of the edge of the lid. Moreover, the sealing ring must be made of relatively soft material so that it can achieve the necessary displacement and deformation in the portion designed for the release of pressure.

EP 0 684 001 B1 discloses a device for automatically controlling the pressure in pressure vessels by means of a seal which is inserted between the pot of the vessel and the lid and which has at least one circumferential portion with a recess on the outside and a reduced cross-section so that the circumferential portion of the seal is deformed by internal pressure produced when the vessel is in use and a predetermined value is exceeded. The deformation results in an escape and release of pressure from the vessel and the cross-section of the seal being reduced by the provision of the recess on its outside in conjunction with at least one notch on the inside. Here too, a deformation of the entire sealing ring is required in the portion designed for the release of pressure if the apparatus is to be functional.

CH 407 459 discloses a pressure cooker having a lid with cylindrical edge which is secured to the edge of the body of the pot by means of a bayonet lock and also holds a sealing ring on the edge of the pot. The sealing ring forms part of an overpressure safety device and is inserted in the lid. Provided in the cylindrical edge of the lid is an inlet or recessed area which is normally bridged by the sealing ring and into which the portion of the sealing ring bridging said recessed area is pressed in the event of an overpressure occurring in the hermetically sealed cooking pot. The pot body and the lid are provided with supporting means at the point corresponding to the recessed area provided in the edge of the lid for the sealing ring, so as to prevent downward compression of the sealing ring in the event of an undesirable steam overpressure in the hermetically sealed cooking pot and to thus prevent a dangerous discharge of steam. In this case, it is also disadvantageous that protuberances have to be provided on the outer cylindrical edge of the lid, with the aforementioned disadvantages. Similar pressure-release mechanisms are disclosed in U.S. Pat. No. 2,600,703 and U.S. Pat. No. 2,600,714.

CH 404 908 discloses a pressure cooker consisting of pot and lid, the edge of the pot and the edge of the lid having cams which together form a bayonet catch which, by turning the lid in one direction, can be brought into the locked position. The lid is provided with a sealing ring for hermetically sealing the interior of the pot, and additionally, between the cams, the edge of the pot has at least one indented area extending in the horizontal portion of the edge for the purpose, when the sealing ring is specifically deformed outwards in radial direction as a result of a dangerous overpressure inside the pot, of opening the connection between the interior of the pot and the pot's surroundings so that the internal pressure is lowered. This design calls for a specific disadvantageous configuration of the edge of the pot and, for functioning of the overpressure safety device, the sealing ring must twist on the inside surface relative to the edge of the pot so that an opening is actually produced for the release of pressure. A device of this type is unreliable and difficult to reproduce.

GB 2 208 131 A discloses a safety venting device for pressure cookers, in which a sealing ring seals the lid relative to the base of a cooking pot and also covers an opening in the lid or base which extends in an area just in front of the inside edge of the sealing ring. In the cylindrical portion of the edge of the lid, a slot is provided, through which, when a predetermined safe pressure is exceeded, the sealing ring can bulge out, resulting in the opening being uncovered for the venting of pressure. It is a disadvantage that this pressure-release mechanism also requires a number of openings to be provided in the vicinity of the edge of the lid. A similar pressure-release device is known from U.S. Pat. No. 4,276,990.

SUMMARY

It is an object of the present invention to propose a pressure vessel of the aforementioned type, preferably for use as a pressure cooker, in which by simple means a reliable functioning of the pressure-release mechanism is ensured.

This objective is, for example, essentially achieved in that, in the circumferential portion of the sealing ring where at least the sealing lip associated with the edge of the vessel with its continuous circumferential sealing surface is reduced or tapered, the sealing ring is provided with at least one pressure-release pocket which is open towards the interior of the vessel, so that—in use—the sealing lip lying tightly against the edge of the vessel is displaced radially outwards and downwards into an intermediate space between the edge of the lid and the edge of the vessel when the predetermined response pressure is exceeded. Owing to the flexibility of the sealing lip associated with the edge of the vessel in the region of the pressure-release pocket compared with the relatively great rigidity of the sealing lip outside of the actual pressure-release pocket and the rigidity of the circumferential spine of the sealing ring, the response behaviour of the pressure-release mechanism is determined solely by this region of the sealing lip, so that no deformation is needed over the cross-section of the sealing ring as a whole and the response behaviour of the pressure-release mechanism can be predetermined more precisely.

According to a particular embodiment of the invention, when the internal pressure of the vessel remains below a given value, the sealing lip associated with the edge of the vessel rests from the inside against the, possibly rounded, transitional region of the edge of the vessel, formed as a pouring lip in the side of the vessel for example, and, when the internal pressure of the vessel exceeds the given value, the sealing lip is displaced outwards and downwards so as to rest from the outside against the outer peripheral area of the edge of the vessel, from which the sealing lip intermittently lifts off or slides off for the release of pressure, that is to say each time the response pressure is exceeded, until an adequate release of pressure has been achieved. On account of the possible formation of the pressure-release pocket according to the invention, when a pressure-release gap is reached in combination with the edge of the vessel, there is a relatively slow and gentle build-up of pressure and a sudden lowering of pressure is prevented. Owing to the construction of pressure-release pockets with a continuous circumferential sealing surface, the shaped sealing ring, having a structure of appropriate height, diameter, lip length etc., can be used in any bayonet system. The manufacturing costs of the pressure-release mechanism are favourably low purely on account of the provision of pressure-release pockets. Additional notching and/or shaping of the lid with the related costs in terms of tools and servicing are not required. The spine of the sealing ring can be given optimum rigidity and its sealing lips can be given optimum flexibility.

A particular optional feature of the invention lies in that at least the sealing lip associated with the edge of the vessel, but preferably both sealing lips, merge into the spine of the sealing ring via a region, particularly a grooved region, which extends over the entire circumference of the sealing ring and is tapered or weakened compared with the thickness of the sealing lips. In this way, irregularities and system tolerances are compensated for and greater ease of movement of the entire locking system is achieved, since the locking forces in respect of the system as a whole are lower thanks to the greater flexibility of the sealing lips.

It is also advantageous if the sealing ring rests with its rear part or spine against a continuous circular-cylindrical peripheral portion of the edge of the lid, which is bent downwards from the body of the lid, so as to provide the sealing ring with reliable all-round support so that the pressure-release function is solely determined by the deformation and displacement of the sealing lip associated with the edge of the vessel.

Several circumferential portions having pressure-release pockets can be provided in the sealing lip associated with the edge of the lid and/or in the sealing lip associated with the edge of the vessel so as to be evenly distributed over the circumference of the sealing ring.

For ensuring the sealing function with pressure-release facility, it can be expedient for the circumferential portions with pressure-release pockets of the sealing lip associated with the edge of the lid to be staggered in the circumferential direction relative to the circumferential portions with pressure-release pockets of the sealing lip associated with the edge of the vessel.

It is also advantageous if the sealing ring is mirror-symmetrical relative to its horizontal median plane. The sealing ring can thus be inserted into the edge of the lid in a horizontal position, but also in the horizontal position produced by turning it through 180° about a circular diameter. Thus any possibility of confusion in respect of the side is avoided. To further facilitate handling of the sealing ring when inserting said sealing ring, the structure of the sealing ring is preferably rotationally symmetrical.

A further advantage of the invention lies in that the outer geometry of the sealing ring is adapted to the inside surface of the edge of the lid without the mode of operation of the sealing lip associated with the edge of the lid being adversely affected.

When operating a pressure vessel according to the invention, particularly great safety can be ensured if a number of circumferential portions with pressure-release pockets are provided, preferably evenly distributed over the circumference of the seal. It is thus ensured that at least one pressure-release pocket is in a favourable circumferential position for lowering the pressure.

The respective circumferential portion with pressure-release pocket is located, in particular in the middle, preferably between two adjacent peripheral locking elements of the lid so that the pressure-release function can be reliably performed.

Furthermore, it is also advantageous if at least one circumferential portion with pressure-release pocket is located, in particular in the middle, in each intermediate space between two adjacent peripheral locking elements of the lid. A system-related radial sliding clearance between pot and lid and the resulting possible fluctuation margin of the response pressure is significantly reduced by the provision of a plurality of pockets.

The number of pressure-release pockets provided can then vary as a function of, for example, the number of segments of the vessel so that there is always at least one pressure-release pocket in a region between segments.

It is also advantageous for the practicability of the present invention that the form and/or material composition of the sealing ring, and in particular of the sealing lip associated with the edge of the vessel, can be adapted, in terms of basic shape, radius, width, height, depth of the pressure-release pocket, the hardness of the material of the spine and/or of the sealing lips, for the purpose of setting the response pressure without the sealing function outside of the area of the pressure-release pockets being adversely affected.

BRIEF DESCRIPTION OF THE DRAWINGS

Further aims, features, advantages and possible applications of the present invention are made apparent in the following description of working examples with reference being made to the attached drawings. All the described and/or illustrated features, whether individually or in any meaningful combination, form the subject-matter of the present invention, and this irrespective of their inclusion in individual claims or when referring back to preceding claims.

The drawings are as follows.

DETAILED DESCRIPTION

Figure 1:
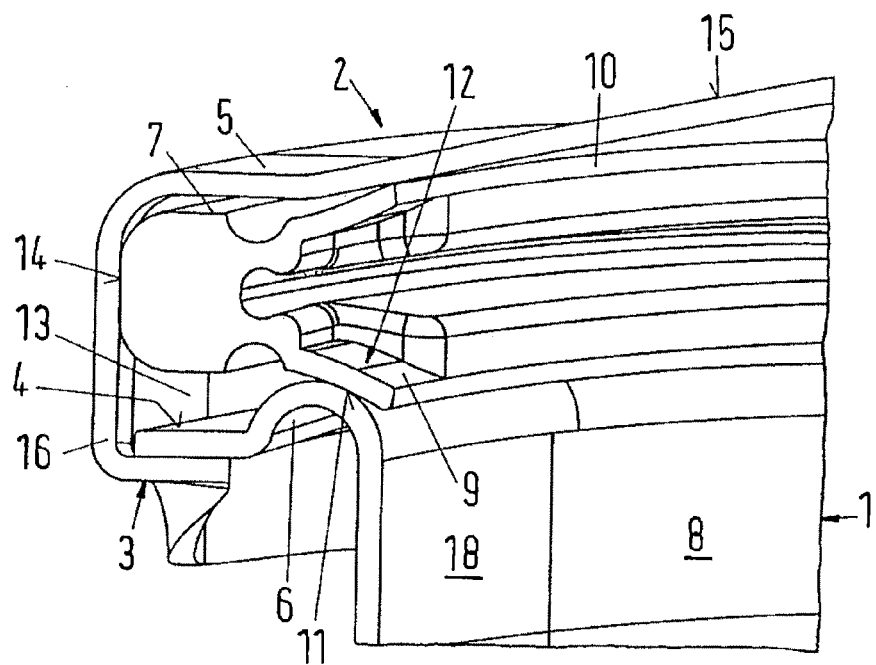
FIG. 1 is a perspective section view of a peripheral area of a pressure vessel in a region of a pressure-release pocket.

According to the graphic representations in the examples of FIGS. 1 to 5, a pressure vessel suitable for use as a pressure cooker includes a pot-like receptacle 1 and a lid 2 to be placed thereon. The lid 2 can be locked on to the receptacle 1 and released again by means of peripheral locking segments 3 and 4 of a bayonet catch located between receptacle 1 and lid 2, as shown in the example of FIG. 1. In the region of the circular edge 5 of the lid 2 and the circular edge 6 of the vessel 1, a circumferential sealing ring 7 made of elastically yielding material, such as rubber or plastic, is inserted between these edges 5, 6 for the purpose of sealing the interior 8 of the vessel in the interlocked position of receptacle 1 and lid 2 against a drop in pressure. Sealing lips 10, 9 of the sealing ring 7 rest tightly against the edge 5 of the lid and against the edge 6 of the vessel 1 respectively, as shown in the example of FIG. 1.

Figure 2:
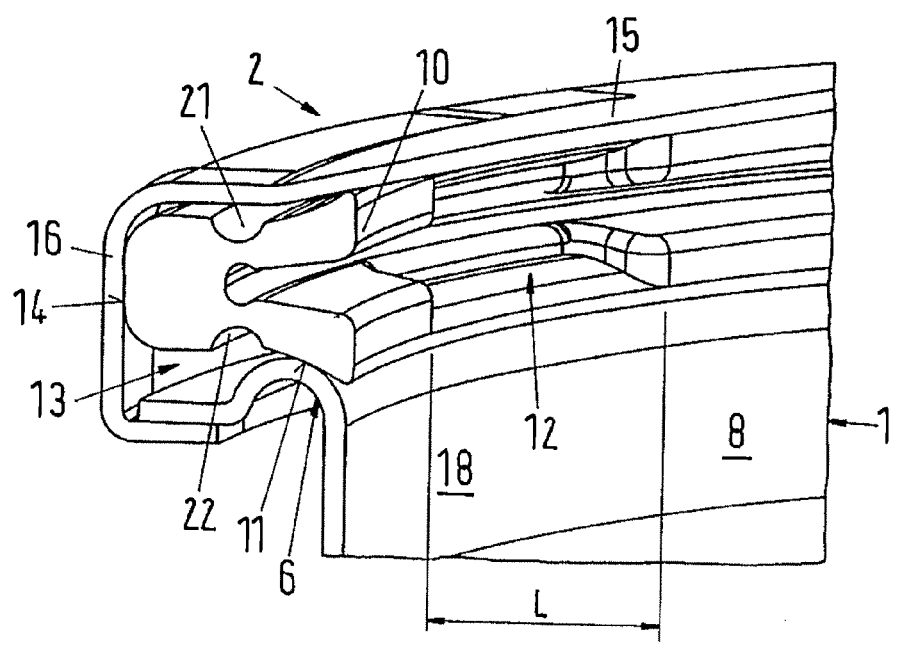
FIG. 2 is a perspective section view of a peripheral area of a pressure vessel outside of a region of a pressure-release pocket where sealing lips of a sealing ring are thicker.
Figure 3:
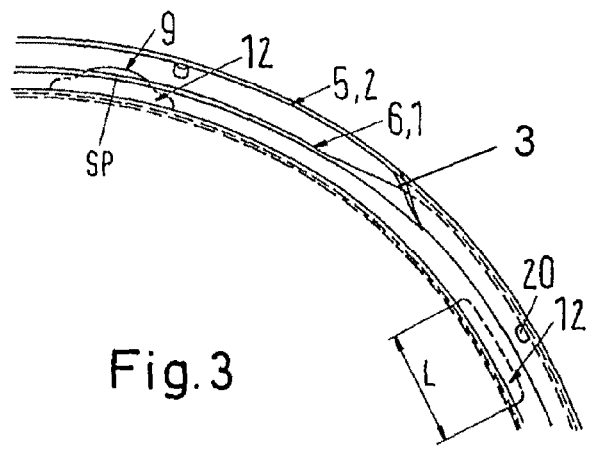
FIG. 3 is a view of a pressure vessel embodying the invention in respect of a portion of the circumferential edge, as seen from below.

For the provision of automatic pressure-control means, the sealing ring 7 can be formed over at least one circumferential portion L so that it is deformed, under the action of a pressure inside the vessel which exceeds a given value (response pressure), in such a way as to form a venting gap SP between receptacle 1 and lid 2, as shown in the example of FIG. 3. In the example shown in FIG. 2, this is achieved in that, in the circumferential portion L of the sealing ring 7, which is tapered relative to the adjoining regions at least in respect of the sealing lip 9 associated with the edge 6 of the vessel with its continuous circumferential sealing surface 11, the sealing ring 7 is provided with at least one pressure-release pocket 12 opening towards the interior 8 of the vessel. Thus, when the predetermined response pressure is exceeded, the sealing lip 9 resting tightly against the edge 6 of the vessel 1 is displaced radially outwards into an intermediate space 13 between the edge 5 of the lid and the edge 6 of the vessel 1, as shown in the example of FIG. 4B.

Figure 4A:
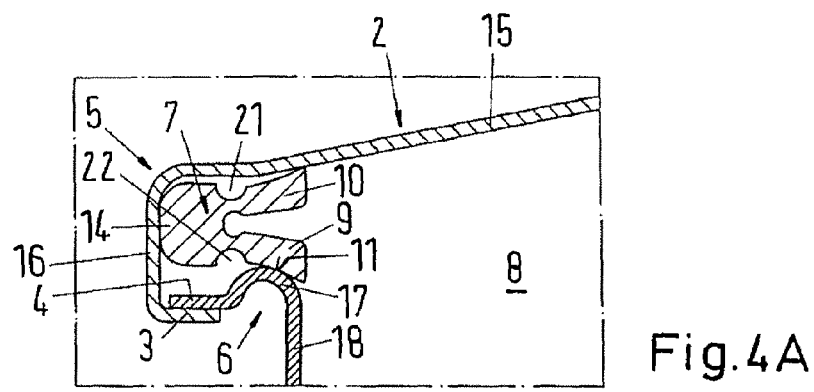
FIG. 4A is a vertical cross-sectional view of a peripheral region of a pressure vessel outside of a circumferential portion with a pressure-release pocket.
Figure 4B:
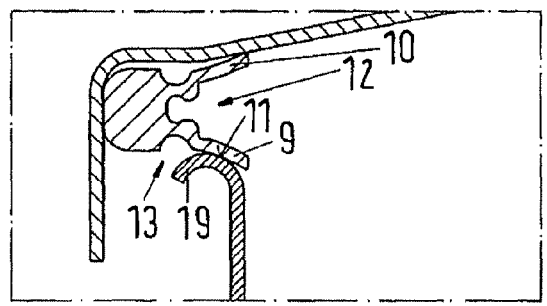
FIG. 4B is a vertical cross-sectional view of a peripheral region of a pressure vessel in a region with a pressure-release pocket during normal operation.
Figure 4C:
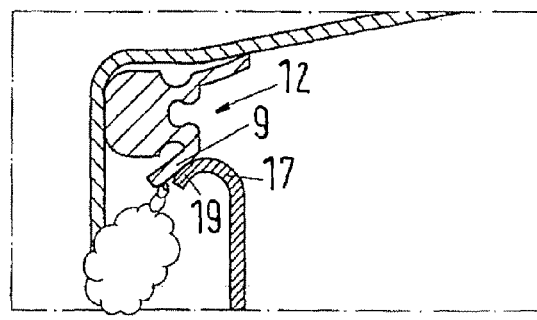
FIG. 4C is a vertical cross-sectional view of FIG. 4B when an internal pressure exceeds a predetermined response pressure.

Below a predetermined pressure inside the vessel, the sealing lip 9 associated with the edge 6 of the vessel rests from the inside against the rounded transitional portion 17 of the edge 6 of the vessel formed as a pouring lip in the side 18 of the vessel as shown in the example of FIG. 4A, and, upon exceeding of the predetermined pressure inside the vessel and its displacement outwards and downwards, as shown in the examples of FIGS. 4B and 4C, rests from the outside against the similarly rounded outer peripheral portion 19 of the edge 6 of the vessel 1, and intermittently rises from or slides off the latter for the release of pressure, providing the above mentioned venting gap SP. In the illustrated example, in respect to its horizontal median plane (in use), the sealing ring 7 including the formation of pockets is configured so as to be mirror-symmetrical so that, in the region of the pressure-release pocket 12, the sealing lips 9, 10 have the same thickness and the sealing ring 7 can be used in each of its two possible horizontal positions.

According to an example, rear portion or spine 14 of the sealing ring 7, which is relatively rigid compared with the sealing lips 9, 10, can rest against a circular-cylindrical peripheral portion 16 which preferably runs all the way round the edge 5 of the lid, with the peripheral portion 16 being bent downwards from the body 15 of the lid, as shown in the examples of FIGS. 1 and 2. It is not necessary for the spine 14 to be deformed for functioning of the pressure-release mechanism. As is made particularly clear in the example of FIG. 5, the structure of the sealing ring 7 is rotationally symmetrical relative to its central median axis. The outer geometry of the sealing ring 7 can easily be adapted to suit the inside surface of the edge 5 of the lid so that the sealing ring 7 is reliably seated in the lid 2.

According to an example, the entire circumference of the sealing ring, the sealing lips 9 and 10 can respectively merge into the relatively rigid spine 14 via an indented region 21, 22 so as to advantageously provide a uniform all-round seal both in respect of the edge 6 of the vessel and the inside surface of the body 15 of the lid, as shown in the example of FIG. 2. In this way, irregularities and system tolerances can be compensated. The locking system can run more smoothly on account of the relatively great flexibility of the sealing lips 9, 10 so that the use of talc or similar lubricants is dispensed with. Thanks to the resulting flexibility of the sealing lips 9, 10 and consequent softness of the sealing ring 7 in the region of the sealing lips, the locking forces of the system as a whole are also minimal.

Figure 5:
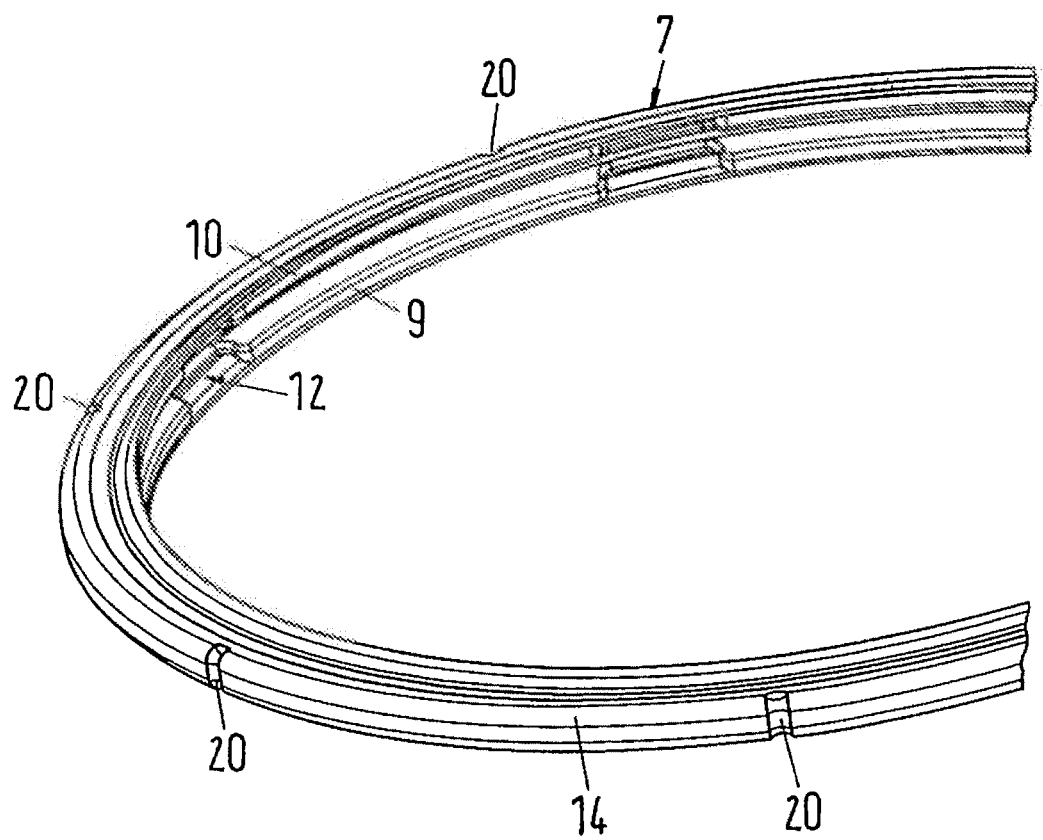
FIG. 5 is an oblique view, partly broken away, of a sealing ring to be used within the framework of the invention.

According to an example, a number of circumferential portions L with pressure-release pockets 12 can be provided and evenly distributed over the circumference of the seal, as shown in the example of FIG. 5. The respective circumferential portion L with pressure-release pocket 12 is then preferably located in the middle between two adjacent peripheral locking segments 3 of the lid 2 and in addition at least one circumferential portion L with pressure-release pocket 12 is located in each intermediate space between two adjacent peripheral locking elements 3, as can be seen in the example of FIG. 3.

FIG. 5 also illustrates that, for the purpose of pressure compensation, the spine 14 of the sealing ring 7 can be provided on the outside with grooves or slots 20 which extend substantially parallel to the axis and are preferably evenly distributed over the circumference.

Obviously, the form and/or material composition of the sealing ring 7 according to the invention can easily be adapted to different situations such as vessel size, configuration of the edges of lid and vessel and response pressure, and this particularly applies to the sealing lip 9 associated with the edge 6 of the vessel in terms of basic shape, radius, width, height, depth of the pressure-release pocket 12 and hardness of the material of the spine 14 and/or of the sealing lips 9, 10.

The invention claimed is:

1. A pressure vessel comprising:
   a pot-like receptacle,
   a lid for placing thereon, the receptacle and the lid being detachably locked together by peripheral locking segments of a bayonet catch, and
   a circumferential sealing ring made of elastically yielding material located in a region of a circular edge of the lid and a circular edge of the receptacle to seal an interior of the receptacle in a locked position of the receptacle and the lid against a drop in pressure,
   wherein the sealing ring includes sealing lips in contact with the edge of the lid and the edge of the receptacle to provide an automatic pressure-control mechanism,
   wherein the sealing ring is formed over at least one circumferential portion of a circumference of the sealing ring such that the sealing ring is deformed, under a pressure inside the vessel which exceeds a predetermined pressure, so as to form a venting gap between the receptacle and the lid,
   wherein, in the circumferential portion of the sealing ring, at least the sealing lip associated with the edge of the receptacle is reduced or tapered at a continuous circumferential sealing surface of the sealing lip,
   wherein the sealing ring is provided with at least one pressure-release pocket opening towards the interior of the vessel, such that when the pressure inside the vessel is below the predetermined pressure, the sealing lip associated with the edge of the receptacle rests from the inside against the edge of the receptacle and when the predetermined pressure is exceeded, the sealing lip is displaced radially outwards and downwards into an intermediate space between the edge of the lid and the edge of the receptacle so as to rest from the outside against the edge of the receptacle,
   wherein a spine of the sealing ring is supported against a continuous circular-cylindrical peripheral portion of the edge of the lid which is bent downwards from a body of the lid so as to provide the sealing ring with an all-round support so that the pressure-release function is solely determined by the deformation and displacement of the sealing lip associated with the edge of the receptacle.

2. A pressure vessel according to claim 1, wherein, below the predetermined pressure inside the vessel, the sealing lip associated with the edge of the receptacle contacts an inside of a transitional portion of the edge of the receptacle and extends towards a side of the receptacle, and,
   wherein upon exceeding the predetermined pressure inside the vessel the sealing lip is displaced outwards such that the sealing lip rests on an outer peripheral region of the edge of the receptacle and intermittently lifts off or slides off from the outer peripheral region of the edge of the receptacle to release the pressure.

3. A pressure vessel according to claim 1, wherein at least the sealing lip associated with the edge of the receptacle merges into a spine of the sealing ring via an indented region which is tapered or reduced relative to a thickness of the sealing lips and extends over the entire circumference of the sealing ring.

4. A pressure vessel according to claim 1, wherein a plurality of circumferential portions with pressure-release pockets are provided,
   wherein the circumferential portions are located in the sealing lip associated with the edge of the lid and/or the edge of the receptacle and are evenly distributed over the circumference of the sealing ring.

5. A pressure vessel according to claim 4, wherein circumferential portions with pressure-release pockets of the sealing lip associated with the edge of the lid are staggered in the circumferential direction relative to the circumferential portions with pressure-release pockets of the sealing lip associated with the edge of the receptacle.

6. A pressure vessel according to claim 1, wherein the sealing ring is mirror-symmetrical relative to a horizontal median plane of the sealing ring.

7. A pressure vessel according to claim 1, wherein a structure of the sealing ring is rotationally symmetrical.

8. A pressure vessel according to claim 1, wherein an outer geometry of the sealing ring is adapted to an inside surface of the lid.

9. A pressure vessel according to claim 1, wherein a plurality of circumferential portions with pressure-release pockets are provided over the circumference of the sealing ring.

10. A pressure vessel according to claim 9, wherein a respective circumferential portion with a pressure-release pocket is located between two adjacent peripheral locking segments of the lid.

11. A pressure vessel according to claim 9, wherein at least one circumferential portion with a pressure-release pocket is located in each intermediate space between two adjacent peripheral locking segments of the lid.

12. A pressure vessel according to claim 1, wherein at least one of a form and a material composition of the sealing ring is adapted in terms of at least one of a basic shape, radius, width, height and depth of the at least one pressure-release pocket and a hardness of a material of a spine of the sealing ring and/or of the sealing lips to set the predetermined pressure.

13. A pressure vessel according to claim 1, wherein the circumferential sealing ring comprises rubber or plastic.

* * * * *